US006414997B1

United States Patent
Piccinelli et al.

(10) Patent No.: US 6,414,997 B1
(45) Date of Patent: Jul. 2, 2002

(54) HIERARCHICAL RECURSIVE MOTION ESTIMATOR FOR VIDEO IMAGES ENCODER

(75) Inventors: Emiliano Piccinelli, Monza; Danilo Pau, San Giovanni; Amedeo Zuccaro, Fosseno di Nebbiuno, all of (IT)

(73) Assignee: STMicroelectronics S.R.L., Agrate Brianza (IT)

( * ) Notice: Subject to any disclaimer, the term of this patent is extended or adjusted under 35 U.S.C. 154(b) by 0 days.

(21) Appl. No.: 09/264,077

(22) Filed: Mar. 5, 1999

(30) Foreign Application Priority Data

Mar. 20, 1998 (EP) .............................. 98830163

(51) Int. Cl.[7] ................................ H04N 7/12
(52) U.S. Cl. ........................ 375/240.17; 375/240.21; 375/240.24
(58) Field of Search .................. 375/240.12, 240.17, 375/240.21, 240.24; H04N 7/12

(56) References Cited

U.S. PATENT DOCUMENTS 5,049,991 A     9/1991   Niihara ..................... 358/136

FOREIGN PATENT DOCUMENTS

| EP | 0 447 068 A2 | 2/1991 | ............ H04N/7/13 |
| EP | 0 535 746 A2 | 9/1992 | ............ H04N/5/14 |
| EP | 0 778 698 A2 | 11/1996 | ............ H04N/5/14 |

OTHER PUBLICATIONS

Siu–Wai Wu et al., "Joint Estimator of Forward/Backward Motion Vectors for MPEG Interpolative Prediction," Proceedings of the Picture Coding Symposium, Mar. 17, 1993, pp. 1–2.

Hsieh et al., "Motion Estimator Algorithm Using Interblock Correlation," Electronics Letters, vol. 26, No. 5, Mar. 1, 1990, pp. 276–277.

*Primary Examiner*—Young Lee
(74) *Attorney, Agent, or Firm*—Lisa K. Jorgenson; Allen, Dyer, Doppelt, Milbrath & Gilchrist, P.A.

(57) ABSTRACT

Relaying on a temporal correlation among successive pictures and using a hierarchical recursive motion estimation algorithm, the hardware complexity of video coders complying with the MPEG-2 standard can be significantly reduced without an appreciable loss of quality of the video images being transferred. Relaying on a temporal correlation among successive pictures is also performed on a spatial correlation of motion vectors of macroblocks of the currently processed picture.

5 Claims, 15 Drawing Sheets

HIERARCHICAL RECURSIVE MOTION ESTIMATOR FOR VIDEO IMAGES ENCODER

FIELD OF THE INVENTION

This invention relates to the field of video image processing, and, more particularly, to video coders compliant with the MPEG-2 standard.

BACKGROUND OF THE INVENTION

The concept of motion estimation is that a set of pixels of a field of a picture may be placed in a position of the subsequent picture obtained by translating the preceding one. These transpositions of objects may expose to the video camera parts that were not visible before as well as changes of their shape, e.g., zooming.

The family of algorithms suitable to identify and associate these portions of images is generally referred to as motion estimation. Such an association permits calculation of the portion of a difference image by removing the redundant temporal information making more effective the subsequent process of compression by DCT, quantization and entropic coding. A typical example of such a method is found in the MPEG-2 standard. A typical block diagram of a video MPEG-2 coder is depicted in FIG. 1. Such a system is made up of the following functional blocks.

Field ordinator. This block includes one or more field memories outputting the fields in the coding order required by the MPEG-2 standard. For example, if the input sequence is I B B P B B P etc., the output order will be I P B B P B B . . . . The intra-coded picture I is a field and/or a semifield containing temporal redundance. The predicted-picture P is a field and/or a semifield from which the temporal redundance with respect to the preceding I or P (previously co-decoded) picture has been removed. The biredictionally predicted-picture B is a field and/or a semifield whose temporal redundance with respect to the preceding I and subsequent P (or preceding P and successive P) picture has been removed. In both cases, the I and P pictures must be considered as already co/decoded. Each frame buffer in the format 4:2:0 occupies the following memory space:

| standard PAL | $720 \times 576 \times 8$ for the luminance($Y$) | = | 3,317,760 bit |
|---|---|---|---|
| | $360 \times 288 \times 8$ for the chrominance($U$) | = | 829,440 bit |
| | $360 \times 288 \times 8$ for the chrominance($V$) | = | 829,440 bit |
| | total $Y + U + V$ | = | 4,976,640 bit |
| standard NTSC | $720 \times 480 \times 8$ for the luminance($Y$) | = | 2,764,800 bit |
| | $360 \times 240 \times 8$ for the chrominance($U$) | = | 691,200 bit |
| | $360 \times 240 \times 8$ for the chrominance($V$) | = | 691,000 bit |
| | total $Y + U + V$ | = | 4,147,200 bit |

Motion Estimator. This block removes the temporal redundance from the P and B pictures.

DCT. This block implements the cosine-discrete transform according to the MPEG-2 standard. The I picture and the error pictures P and B are divided in 8*8 blocks of pixels Y, U, V on which the DCT transform is performed.

Quantizer Q. An 8*8 block resulting from the DCT transform is then divided by a quantizing matrix to reduce the magnitude of the DCT coefficients. In such a case, the information associated to the highest frequencies less visible to human sight tends to be removed. The result is reordered and sent to the successive block.

Variable Length Coding (VLC). The codification words output from the quantizer tend to contain a large number of null coefficients, followed by nonnull values. The null values preceding the first nonnull value are counted, and the count figure forms the first portion of a codification word. The second portion represents the nonnull coefficient. These paired values tend to assume values more probable than others. The most probable ones are coded with relatively short words composed of 2, 3 or 4 bits. The least probable ones are coded with longer words. Statistically, the number of output bits is less than in the case such methods are not implemented.

Multiplexer and Buffer. Data generated by the variable length coder, the quantizing matrices, the motion vectors and other syntactic elements are assembled for constructing the final syntax examined by the MPEG-2 standard. The resulting bitstream is stored in a memory buffer. The limit size of which is defined by the MPEG-2 standard and cannot be overfilled. The quantizer block Q respects such a limit by making the division of the DCT 8*8 blocks dependent upon the filling limit of such a memory buffer, and on the energy of the 8*8 source block taken upstream of the motion estimation and the DCT transform process.

Inverse Variable Length Coding (I-VLC). The variable length coding functions specified above are executed in an inverse order.

Inverse Quantization (IQ). The words output by the I-VLC block are reordered in the 8*8 block structure, which is multiplied by the same quantizing matrix that was used for its preceding coding.

Inverse DCT (I-DCT). The DCT transform function is inverted and applied to the 8*8 block output by the inverse quantization process. This permits passing from the domain of spatial frequencies to the pixel domain.

Motion Compensation and Storage. At the output of the I-DCT block the following may alternatively be present. A decoded I picture or semipicture that must be stored in a respective memory buffer for removing the temporal redundance with respect to subsequent P and B pictures. A decoded prediction error picture or semipicture P or B that must be summed to the information removed previously during the motion estimation phase. In case of a P picture, such a resulting sum stored in a dedicated memory buffer is used during the motion estimation process for the successive P pictures and B pictures. These field memories are generally distinct from the field memories that are used for re-arranging the blocks.

Display Unit. This unit converts the pictures from the format 4:2:0 to the format 4:2:2, and generates the interlaced format for displaying the images. Arrangement of the functional blocks depicted in FIG. 1 into an architecture implementing the above-described coder is shown in FIG. 2. A distinctive feature is that the field ordinator block, the motion compensation and storage block for storing the already reconstructed P and I pictures, and the multiplexer and buffer block for storing the bitstream produced by the MPEG-2 coding are integrated in memory devices external to the integrated circuit of the core of the coder. The decoder accesses the memory devices through a single interface suitably managed by an integrated controller.

Moreover, the preprocessing block converts the received images from the format 4:2:2 to the format 4:2:0 by filtering and subsampling the chrominance. The post-processing block implements a reverse function during the decoding and displaying phase of the images.

The coding phase also uses the decoding for generating the reference pictures to make operative the motion estimation. For example, the first I picture is coded, then decoded, stored as described in the motion compensation and storage block, and used for calculating the prediction error that will be used to code the subsequent P and B pictures. The play-back phase of the data stream previously generated by the coding process uses only the inverse functional blocks I-VLC, I-Q, I-DCT, etc., never the direct functional blocks. From this point of view, it may be said that the coding and the decoding implemented for the subsequent displaying of the images are nonconcurrent processes within the integrated architecture.

A description of the exhaustive search motion estimator is provided in the following paragraphs. The P field or semifield is first addressed. Two fields of a picture are considered and the same applies to the semifields. Q1 at the instant t, and the subsequent field Q2 at the instant t+(kp)*T are considered. The constant kp is dependant on the number of B fields existing between the preceding I and the subsequent P, or between two Ps. T is the field period which is $\frac{1}{25}$ sec. for the PAL standard and $\frac{1}{30}$ sec. for the NTSC standard. Q1 and Q2 are formed by luminance and chrominance components. The motion estimation is applied only to the most energetic, and therefore richer of information component, such as the luminance, which is representable as a matrix of N lines and M columns. Q1 and Q2 are divided in portions called macroblocks, each of R lines and S columns.

The results of the divisions N/R and M/S must be two integer numbers, but not necessarily equal to each other. Mb2 (i,j) is a macroblock defined as the reference macroblock belonging to the field Q2 and whose first pixel, in the top left part thereof is at the intersection between the i-th line and the j-th column. The pair (i,j) is characterized by the fact that i and j are integer multiples of R and S, respectively. FIG. 2b shows how the reference macroblock is positioned on the Q2 picture while the horizontal dash line arrows indicate the scanning order used for identifying the various macroblocks on Q2. MB2 (i,j) is projected on the Q1 field to obtain MB1 (i,j). On Q1, a search window is defined having its center at (i,j) and composed of the macroblocks MBk[e,f], where k is the macroblock index. The k-th macroblock is identified by the coordinates (e,f), such that $-p<=(e-i)<=+p$ and $-q<=(f-j)<=+q$. The indices e and f are integer numbers.

Each of the macroblocks are said to be a predictor of MB2 (i,j). For example, if p=32 and q=48, the number of predictors is (2p+1)*(2q+1)=6,305. For each predictor, the norm L1 with respect to the reference macroblock is calculated. Such a norm is equal to the sum of the absolute values of the differences between common pixels belonging to MB2 (i,j) and to MBk (e,f). Each sum contributes R*S values, the result of which is called distortion. Therefore, (2p+1)*(2q+1) values of distortion are obtained, among which the minimum value is chosen, thus identifying a prevailing position (e•,f•).

The motion estimation process is not yet terminated because in the vicinity of the prevailing position, a grid of pixels is created for interpolating those that form Q1. For example, if Q1 is composed of:

. . .
p31 p32 p33 p34 p35 . . .
p41 p42 p43 p44 p45 . . .
. . .

After interpolation, the following is obtained:

| p31 | 11 | p32 | ... |
|---|---|---|---|
| 12 | 13 | 14 | ... |
| p41 | 15 | p42 | ... | where 11=(p31+p32)/2
12=(p31+p41)/2
13=(p31+p32+p41+p42)/4
14=(p32+p42)/2
15=(p41+p42)/2

The above noted algorithm is applied in the vicinity of the prevailing position by assuming, for example, p=q=1. In such a case, the number of predictors is equal to 8 and are formed by pixels that are interpolated starting from the pixels of Q1. Let's identify the predictor with minimum distortion with respect to MB2 (i,j). The predictor more similar to MB2 (i,j) is identified by the coordinates of the prevailing predictor through the above noted two steps of the algorithm. The first step tests only whole positions while the second step tests the sub-pixel positions. The vector formed by the difference components between the position of the prevailing predictor and of MB2 (i,j) is defined as the motion vector, and describes how MB2 (i,j) derives from a translation of a macroblock similar to it in the preceding field. It should be noted that other measures may be used to establish whether two macroblocks are similar. For example, the sum of the quadratic values of the differences (norm L2) may be used. Moreover, the sub-pixel search window may be wider than that specified in the above example. All this further increases the complexity of the motion estimator.

In the example described above, the number of executed operations per pixel is equal to 6,305+8=6,313, wherein each operation includes a difference between two pixels plus an absolute value identification plus a storage of the calculated result between the pair of preceding pixels of the same macroblock. This means that to identify the optimum predictor, there is a need for 6.313*S*R parallel operators at the pixel frequency of 13.5 MHZ. By assuming R=S=16, as defined by the MPEG-2 standard, the number of operations required: is 6,313*16*16=1,616,128. Each operator may function on a time division basis on pixels that belong to different predictors. Therefore, if each of these predictors operated at a frequency 4*13.5=54 MHz, the number of operators required would be 1,616,128/4=404,032.

The B field or semifield is addressed next. Three picture fields are considered, and the same applies also to semifields $QP_{n-1}$ at the instant t, $QBk_B$ at the instant $t+(k_B)*T$, and $QP_n$ at the instant $t+(k_p)*T$ with $k_P$ and $k_B$ dependant on the number of B fields or semifields preventively selected. T is the field period with $\frac{1}{25}$ sec. for the PAL standard and $\frac{1}{30}$ sec. for the NTSC standard. $QP_{n-1}$, $QBk_B$ and $QP_n$ are formed by luminance and chrominance components. The motion estimation is applied only to the most energetic, and therefore richer of information component, such as the luminance, which is representable as a matrix of N lines and M columns. $QP_{n-1}$, $QBk_B$ and $Qp_n$ are divided into portions called macroblocks, each of R lines and S columns. The results of the divisions N/R and M/S must be two integer numbers, but not necessarily equal.

MB2 (i,j) is a macroblock defined as the reference macroblock belonging to the field Q2 and whose first pixel, in the top left part thereof, is at the intersection between the i-th line and the j-th-column. The pair (i,j) is characterized by the fact that i and j are integer multiples of R and S, respectively.

MB2 (i,j) is projected on the fQP$_{n-1}$ field to obtain MB1 (i,j), and on the Qp$_n$ to obtain MB3 (i,j).

On QP$_{n-1}$ a search window is defined with its center at (i,j) and composed of the macroblocks MB1k[e,f], and on Qp$_n$ a similar search window whose dimension may also be different, or in any case predefined. This is made up by MB3k[e,f], where k is the macroblock index. The k-th macroblock on the QP$_n$ is identified by the coordinates (e,f), such that $-p1<=(e-i)<=+p1$ and $-q1<=(f-j)<=+q1$. This is while the k-th macroblock on the QP$_n$ field is identified by the coordinates (e,f), such that $-p3<=(e-i)<=+p3$ and $-q3<=(f-j)<=+q3$. The indexes e and f are integer numbers.

Each of the macroblocks are said to be a predictor of MB2 (i,j). There are in this case two types of predictors for MB2 (i,j). One is on the field that temporally precedes the one containing the block to be estimated (I or P). This is referred to as forward. The second type is those obtained on the field that temporally follows the one containing the block to be estimated (I or P). This is referred to as backward. For example, if p1=16, q=32, p2=8, q2=16, the numbers of predictors is $(2p1+1)*(2q1+1)+(2p2+1)*(2q2+1)=2,706$.

For each predictor, the norm L1 with respect to the reference macroblock is calculated. Such a norm is equal to the sum of the absolute values of the differences between common pixels belonging to MB1 (i,j), and to MB1k (e,f), or MB3k (e,f). Each sum contributes R*S values, the result of which is called distortion. Hence, we obtain the forward distortion values $(2p1+1)*(2q1+1)$, among which the minimum value is chosen. This identifies a prevailing position $(e_F\bullet,f_F\bullet)$ on the field QP$_{n-1}$, $(2p2+1)*(2q2+1)$ backward distortion values among which the minimum value is again selected identifying a new prevailing position $(e_B\bullet,f_B\bullet)$ on the QP$_n$ field.

The motion estimation process is not yet attained because in the vicinity of the prevailing position, a grid of pixels is created to interpolate those that form QP$_{n-1}$ and QP$_n$. For example if QP$_{n-1}$ is . . .
p32 p33 p34 p35 . . .
p42 p43 p44 p45 . . .
. . .

After intertpolation, we have:

| p31 | 11 | p32 | ... |
|---|---|---|---|
| 12 | 13 | 14 | ... |
| p41 | 15 | p42 | ... |

11=(p31+p32)/2
12=(p31+p41)/2
13=(p31+p32+p41+p42)/4
14=(p32+p42)/2
15=(p41+p42)/2

The above noted algorithm is applied in the vicinity of the prevailing position by assuming, for example, p=q=1. In such a case, the number of predictors is equal to 8, and are formed by pixels that are interpolated starting from the pixels of QP$_{n-1}$. The predictor with minimum distortion with respect to MB2 (i,j) is nonidentified. In the same way we proceed for the QP$_n$ field. The predictor more similar to MB2 (i,j) on QP$_{n-1}$ and on QP$_n$ is identified by the coordinates of the prevailing predictor through the above stated two steps of the algorithm predicted on each field. The first step tests only whole positions while the second the sub-pixel positions. At this point we calculate the mean square errors of the two prevailing predictors (forward and backward). That is, the sums of the square of the differences pixel by pixel between the MB2 (i,j) with $(e_F\bullet,f_F\bullet)$ and with $(e_B\bullet,f_B\bullet)$.

Moreover, the mean square error between MB2 (i,j) is calculated with a theoretical macroblock obtained by linear interpolation of the two prevailing predictors. Among the three values thus obtained, we select the lowest. MB2 (i,j) may be estimated using only $(e_F\bullet,f_F\bullet)$ or just $(e_B\bullet,f_B\bullet)$ or both, though averaged.

The vector formed by the components is a difference between the position of the prevailing predictor and of MB2 (i,j). The vectors are defined as the motion vectors and describe how MB2 (i,j) derives from a translation of a macroblock similar to it in the preceding and/or successive field. In the example described above, the number operations carried out for each pixel is equal to $2,706+8*2=2,722$, where each operation includes a difference between two pixels plus an absolute value plus an accumulation of the calculated result between the pair of preceding pixels and comprised in the same macroblock. This means that for identifying the optimum predictor, there is a need for $2,722*R*S$ parallel operators at the pixel frequency of 13.5 MHz. By assuming R=S=16, as defined by the MPEG-2 standard, the number of operations required is $2,722*16*16=696,832$.

Each operator may function on a time division basis on pixels belonging to different predictors. Therefore, if each of them operated at a frequency of $4*13.5=54$ MHz, the number of operators required would be $696,832/4=174,208$. A high level block diagram of a known motion estimator based on an exhaustive search technique is depicted in FIG. 3, wherein the DEMUX block conveys the data coming from the field memory to the operators. In addition, the MIN block operates on the whole of distortion values for calculating the minimum one.

SUMMARY OF THE INVENTION

An object of the present invention is to reduce the complexity of a motion estimator as used, for example, in an MPEG-2 video coder.

As an illustration of an efficient implementation of the method and architecture of the motion estimator of the present invention, a coder for the MPEG-2 standard will be taken into consideration. Using the motion estimator of the invention, it is possible, for example, to use only 6,5 operations per pixel to find the best predictor of the portion of a picture currently being subjected to motion estimation. This is for an SPML compressed video sequence of either PAL or NTSC type. In contrast, the best result that may be obtained with a motion estimator of the prior art would require execution of 569 operations per pixel. This is in addition to the drawback of requiring a more complex architecture.

The method of the invention implies a slight loss of quality of the reconstructed video images for the same compression ratio. Nevertheless, such a degradation of the images is practically undetectable to human sight because the artifaxes are distributed in regions of the images having a substantial motioncontent. The details of which practically pass unnoticed by the viewer.

The following paragraphs provide a description of a hierarchical recursive motion estimator of the invention. The number of operations per pixels required by the coding process may be significantly reduced once the use of vectors calculated by the motion estimation process for macroblocks, spatially and temporally in the vicinity of the current macroblock, are received.

The method herein disclosed is based on the correlation that exists among motion vectors associated to macroblocks in a common position in temporally adjacent images. Moreover, the motion vectors also associated to macroblocks belonging to the same picture, spatially adjacent to the current one, may represent with small errors the motion of the current macroblock.

The process of motion estimation of the invention meets the following requirements. The integration of the required number of operators necessary for implementing the method of motion estimation, together with auxiliary structures such as memories for allowing the reuse of precalculated vectors, must be significantly less burdensome than that of motion estimators that do not include the method of the invention. The loss of quality of the reconstructed images for a given compression ratio must be practically negligible as compared to motion estimators that do not implement the method of the invention.

In the ensuing description of the method for motion estimation, reference is made to a whole fields equal in number to the distance imposed beforehand and equal to M between two subsequent P or I fields. Included is a total number of fields equal to M+2, which will then be taken into consideration, according to the scheme of FIG. 2b. The temporal distance between two successive pictures are equal to a period of a field. In particular, let us assume to have already considered the first $QP_{n-1}$, motion estimation with respect to the preceding (Q0) motion estimation. Its association is also considered to a motion field per macroblock. The motion field is generated by using the same method of the first step, as described below.

With respect to the first step, the prevailing macroblock predictor MBQB (i,j) belonging to the QB1 field is searched on Qpn−1. That is, the portion of $Qp_{n-1}$ that more resembles it. The method is applied to all the QB1 macroblocks preceding it following a scanning order from left to right, and from the top to bottom. According to FIG. 2c, mv_MB5 (i, j+S) is the motion vector associated to the macroblock belonging to $QP_{n-1}$ and identified by the coordinates (i, j+S). mv_MB6 (i+R, j) is the motion vector associated to the macroblock belonging to $QP_{n-1}$ and identified by the coordinates (i+R, j). mv_MB3 (i, j−S) is the motion vector associated to the macroblock belonging to QB1 and identified by the coordinates (i, j−S). mv_MB4 (i−R, j) is the motion vector associated to the macroblock belonging to QB1 and identified by the coordinates (i−R, j).

Let us consider, by way of example, to use the above vectors for identifying, during a first phase, four predictors starting from the projection of MBQB1 on $Qp_{n-1}$. The prevailing predictor is identified by using the norm L1 or the norm L2, etc. Generally, it is possible to use more than two predictors belonging to $QP_{n-1}$, and also in a different number from those belonging to QB1. The above noted example is very effective during simulation. The norm associated to the prevailing predictor is thereafter compared with precalculated thresholds derived from statistical considerations. Such thresholds identify three subsets, each composed of F pairs of vectors. Each pair, for example, is composed of vectors having components equal in terms of absolute value, but opposite in sign. In the second step, such F pairs are summed to the vector that represents the prevailing predictor. They also identify other 2*F predictors among which there may also be sub-pixels positions.

The prevailing predictor, in the sense of the norm, is the predictor of MBQB1 (i,j) on $Qp_{n-1}$. This is the difference between their common coordinates associated with the motion vector. The norm is calculated starting from the result obtained by subsampling the macroblock according to a quincux scheme, or by interpolating the pixels of $QP_{n-1}$ for generating predictor macroblocks disposed in sub-pixels positions. The quincux grid is obtained by eliminating a pixel every two from the macroblock according to the following scheme:

source macroblock

| A1 | A2 | A3 | A4 | A5 | A6 | ... |
| B1 | B2 | B3 | B4 | B5 | B6 | ... |
| C1 | C2 | C3 | C4 | C5 | C6 | ... | subsampled macroblock

| A1 |    | A3 |    | A5 |    |
|    | B2 |    | B4 |    | B6 |
| C1 |    | C3 |    | C5 |    |

In this way, the operations necessary for calculating the norm are reduced by 50% compared to the case of an exhaustive search technique of a known motion estimator. The method used for interpolating the pixels of $QP_{n-1}$, thus generating the sub-pixels thereof, is the one used in the exhaustive search estimator of the prior art. The description above for QB1 also applies for the successive fields QB2 . . . QB(M−1). $QP_n$ calculates the predictors of each of the respective fields immediately preceding temporally to obtain a motion estimator for each field of the partial sequence considered. The motion estimators must be stored in a suitable structure to enable the second step.

For the second step, the $QP_n$ field (type P) is coded, and this requires a spreading of its macroblocks with respect to the $QP_{n-1}$ field positioned at a temporal distance equal to M field periods. To perform this estimation let us consider the $MBP_n$ (i,j) block belonging to $QP_n$, where i and j represent the position of the first top left pixel of the above mentioned macroblock with respect to the top left corner of the field it belongs to. It is assumed that all the preceding $QP_n$ macroblocks have already been submitted to such a process according to the scanning order.

By referring to FIG. 2d, let us consider the two blocks of coordinates (i, j−S) immediately to the left and above (coordinates (i−R, j)) the block to be estimated $MBP_n$ (i,j). Both belong to $QP_n$ and have already been submitted to motion estimation. They are therefore associated with two motion vectors which will identify, on $QP_{n-1}$, two spatial predictors macroblocks. Moreover, let us consider the field immediately preceding in a temporal sense the current one. QB(M−1) has been already submitted to motion estimation with respect to its own previous field, QB(M−2). Each of its macroblock has an associated translation vector. A portion of such vectors may be considered to identify, properly scaled in terms of the temporal distance existing between $QP_{n-1}$ and $QP_n$, the new $MBP_n$ (i,j). This is referred to as temporal predictors. These predictors are positioned on $QP_{n-1}$.

In particular, the positions identified by the motion vectors associated to the macroblocks as indicated in the figure with $T_{1,2}$ are tested if the temporal distance to estimate is of one field period.

In this case, only the vectors associated with T1 having coordinates (i, j+S) and (i+R, j) will be used. Otherwise, those indicated by T2 should also be considered and whose coordinates are (i+R, j+2*S), (i+2*R, j+S), (i+2*R, j−S), (i+R, j−2*S). The number of these temporal predictors may also be different from the number indicated. However, this choice is made based on the best experimental results.

Among all the indicated predictors, only one is chosen using the criterion of the norm L1. This norm is then compared with precalculated thresholds derived from statistical considerations. These thresholds identify 3 sub-sets of pairs of vectors, whose components are equal in absolute value, but with opposite signs. The number of such pairs is taken equal to F, and F is the function of the temporal distance to cover by the estimation (F=F(T_dist)). In the second phase, such pairs are added to the vector that identifies the prevailing predictor and identifies other 2*F predictors among which there may be also subpixel positions. The prevailing norm is the predictor of $MBP_n$ (i,j) on $QP_{n-1}$, and the difference between their common coordinates identifies the motion vector to it associated.

For example, the number of operations per pixel according to the above described method for the P fields is equal to:

| | |
|---|---|
| first step | 12 |
| second step | 24 |
| coordinate position (i-0, j-0) | 1 |
| partial total | 37 (without quincux subsampling) |
| final total | 18.5 (with quincux subsampling) |

This is followed by the estimation of the B fields. The procedure considers that the estimate is to be carried out both for the P or I field that temporally precedes the one to be estimated. This is with respect to both the I or P field that follows. As for the estimation of the preceding I or P field, the process is similar to that described above. For the estimation of the successive field P or I, there are some differences in using the temporal predictors. In this case, this term is used to identify the motion vectors associated to the macroblocks positioned in the same positions as described above for the temporal predictors of the P fields. They belong to the immediately successive field in a temporal sense to the one to be estimated. Accordingly, they always move in the estimate direction. For example, to estimate QB(M−2) with respect to $Qp_n$, the vectors associated to the QB(M−1) field are used. The latter are calculated during the implementation of the first algorithmic step.

It is necessary that such vectors are symmetrically overturned with. respect to the origin, because they identify the position of a block belonging to a future field as compared to a previous field. It is also necessary to scale them in a proper manner as a function of the temporal distance between the current field and the field to be estimated. At this point, the best backward predictor is chosen between the two spatial and temporal ones, for example, 2 or 6. A certain number of pairs of small vectors symmetrical with respect to the origin are again chosen. Such a number is also a function of the temporal distance to cover. They are chosen within the predefined whole by comparing the norm found with some thresholds as defined by statistical considerations. Such pairs of vectors, added to the prevailing one found above, will identify new predictors among which there may also be sub_pixel positions.

The prevailing norm is the final backward predictor for the block subject to estimation.

Finally, for each macroblock, two predictors are identified. One on the I or P field that temporally precedes QB(M−2), and one on the successive I or P field. A third predictor is also identified and obtained by linear interpolation of the pixels belonging to the above cited predictors.

Out of the three predictors one is chosen based on the norm L1. The latter will be the final predictor which is subtracted from the reference block, which is the one submitted to estimation. In this way, the prediction error is obtained.

For example, the number of operations per pixel, according to the above described method, is equal to:

| | |
|---|---|
| first step | 12 |
| second step | 33 |
| coordinate position (i-0, j-0) | 1 |
| partial total | 46 (without quincux subsampling) |
| final total | 23 (with quincux subsampling) |

In these conditions, the performance in terms of signal/noise ratio obtained is equivalent to that of the known exhaustive search estimator (see FIG. 3), while the complexity of the hardware implementation is significantly reduced.

BRIEF DESCRIPTION OF THE DRAWINGS

The different aspects and advantages of the invention will become even more evident through the following description of an embodiment and by referring to the attached drawings, wherein.

DETAILED DESCRIPTION OF THE PREFERRED EMBODIMENTS

Figure 4:
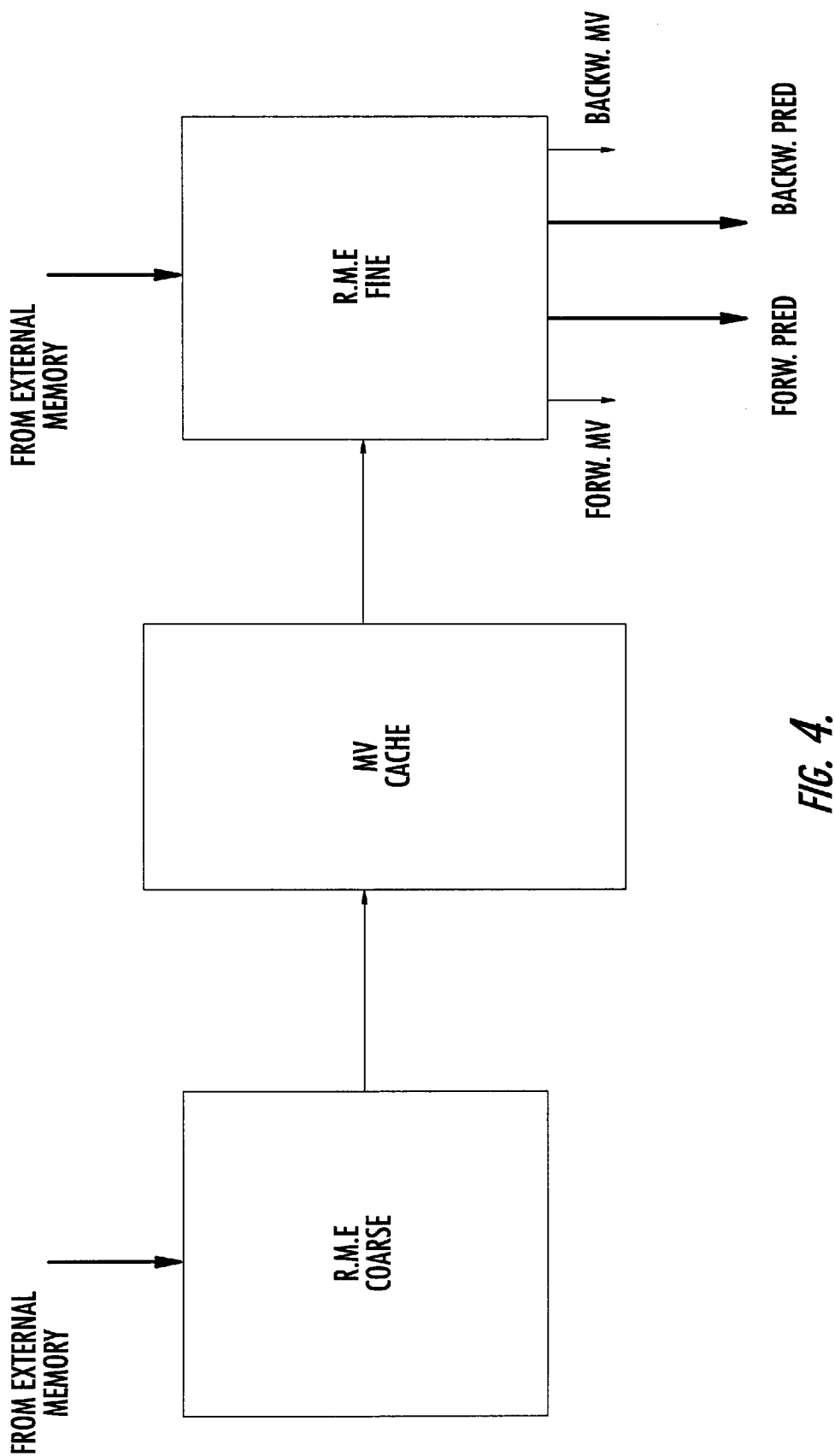
FIG. 4 shows the architecture of the hierarchical recursive motion, according to the present invention.

The architecture of the hierarchical recursive motion estimator of the invention is described in the following paragraphs. A block diagram of the hierarchical recursive motion estimator of the invention is depicted in FIG. 4. In particular, there are three blocks. The first block carries out the first step of the procedure, which is the initialization and convergence of the motion fields. The third block carries out the second step of the algorithm which is the coding of the MPEG-2 fields. The above cited blocks interact through a memory that contains the two motion fields of the fields comprised between the first I or P field, and a successive one of the same type.

Figure 5:
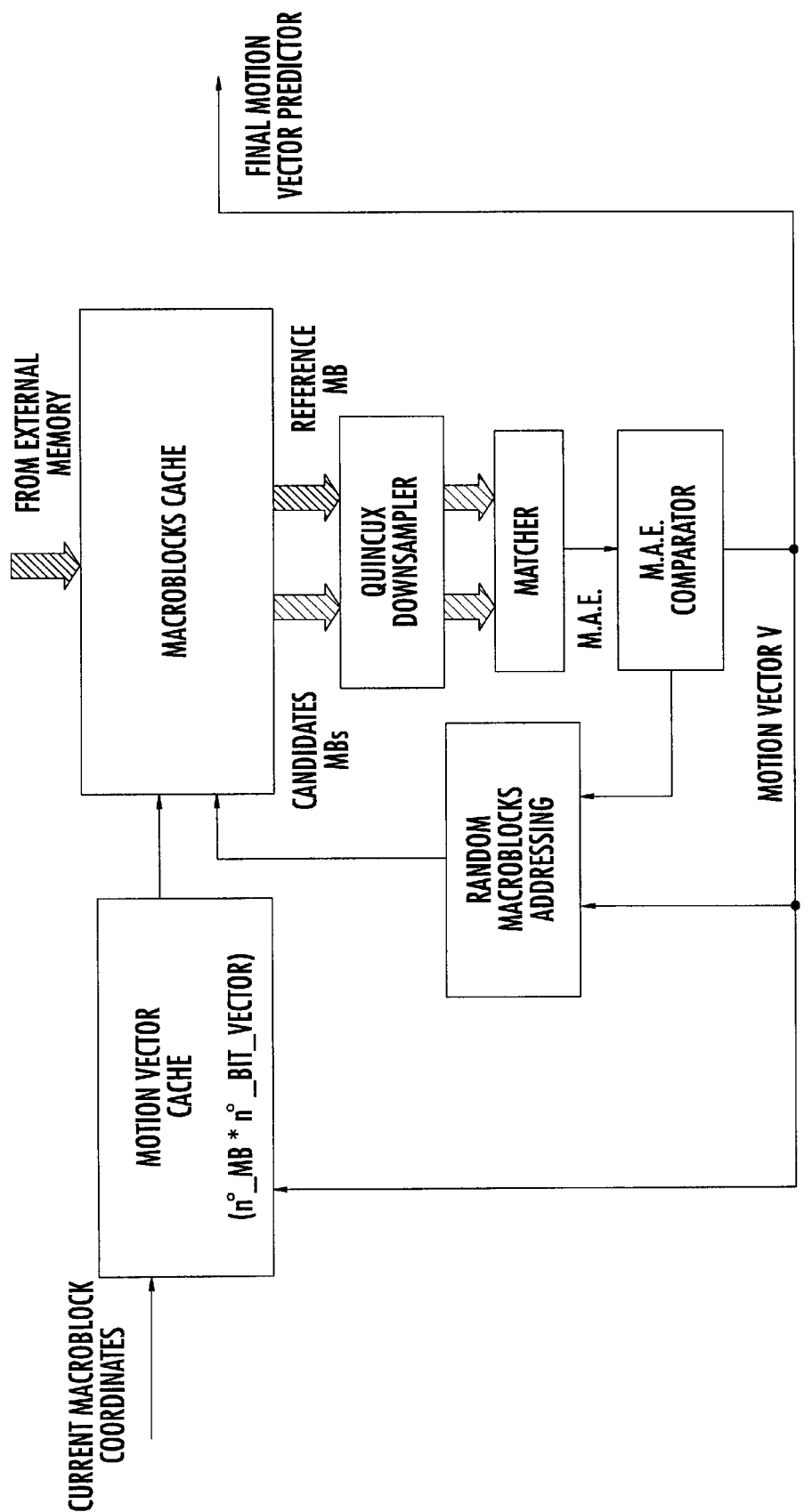
FIG. 5 shows the architecture of the estimator of FIG. 4, relative to the first coding phase.

The block referred to as R.M.E. Coarse is shown in FIG. 5. This identifies a memory of $(N*M)/(R*S)$ cells, each of T bits, containing the motion vectors associated to the macroblocks preceding the current one, and disposed on the same field and on the preceding one. Moreover, there is also a memory for storing the predictors belonging to the current field. This memory has dimensions $G*H*R*S*8$, and permits limitation to the number of accesses to the external memory. This would otherwise need to be accessed every time a predictor is required to feed the motion estimator. This increments the passband. By referring again to the same example described above, let us consider step 1 during which the four motion vectors are mv MB5 (i, j+S), mv MB6 (i+R, j), mv__MB3 (i, j−S), and mv__MB4 (i−R, j).

Depending on the position (i,j) of the macroblock which is being subjected to motion estimation, and the reference macroblock, the motion vectors are acquired by the block memory of the motion vectors. They are used for addressing the macroblock memory, from which the four macroblocks are fed, one at a time to the quincux subsampling block. These subsampled macroblocks, eventually interpolated for defining the sub-pixel position, thereafter feed the block that calculated the norm L1 or L2, etc. between the predictor and the reference predictor. The norm, by identifying the prevailing predictor of step 1 of the processing, permits the M.A.E. comparator to address a ROM, wherein vectors to be summed to the one associated to the prevailing predictor are stored.

The ROM is contained in the block called random addressing of macroblocks. The output of this block provides the addresses that are used for singling out the predictors in the macroblocks memory. These predictors feed the same blocks described in relation to step 1. At the end of step 2, the motion vector V is obtained, and is stored in a register, and made available to the coding process.

Figure 1:
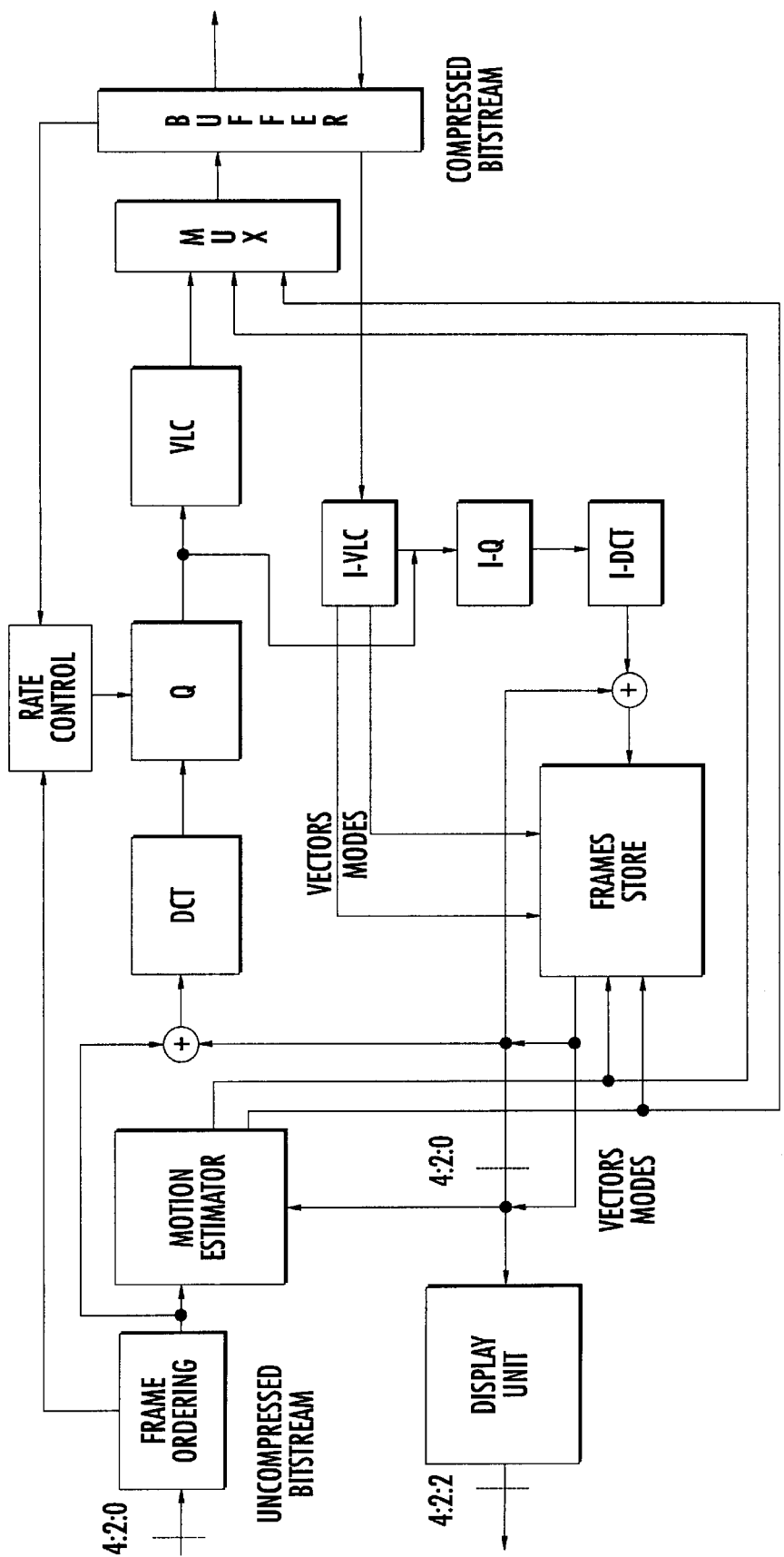
FIG. 1 is a basic diagram of a video coder MPEG-2 MPML including the motion estimator block, according to the prior art.
Figure 2:
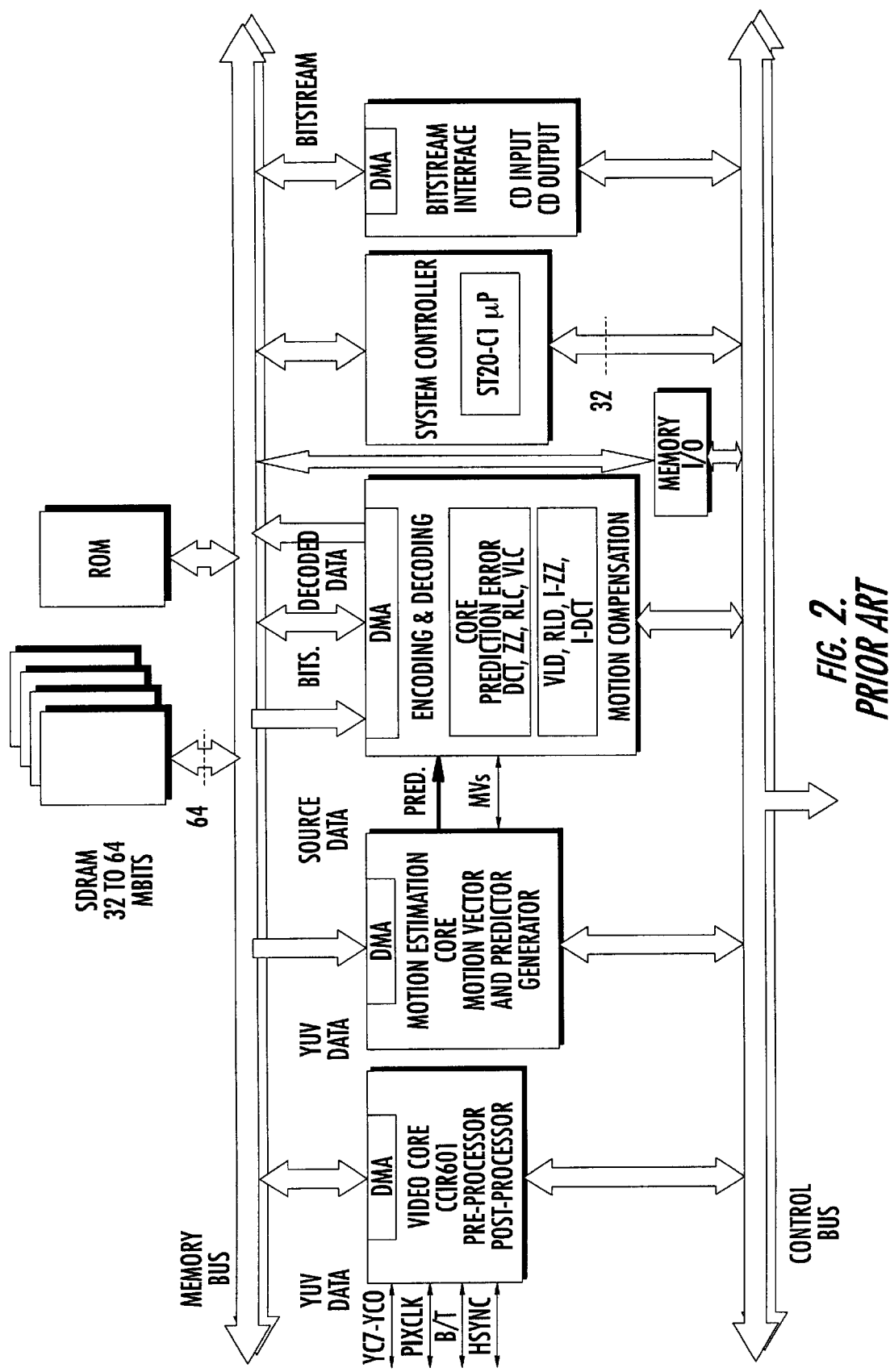
FIG. 2 shows the architecture of the coder MPEG-2 MPML of FIG. 1.
Figure 2A:
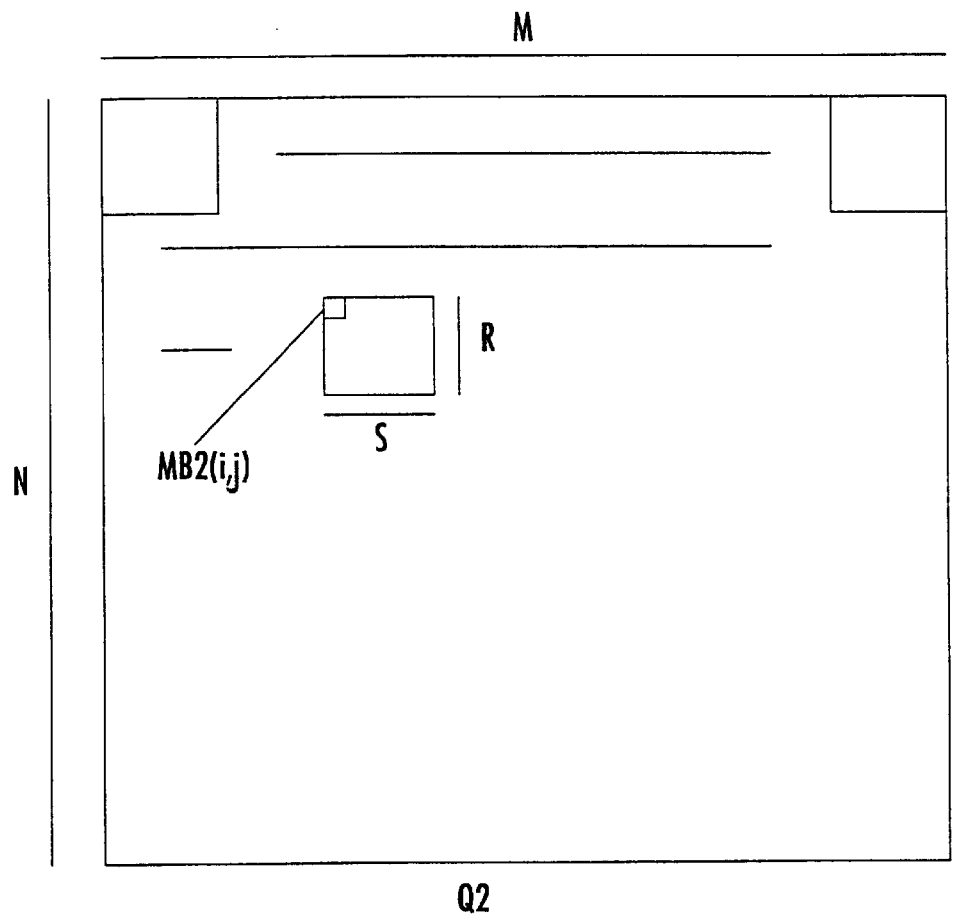
FIG. 2a is a reference scheme of the relative position of the macroblock taken into consideration in the description of the known method of motion estimation, according to the prior art.
Figure 2B:
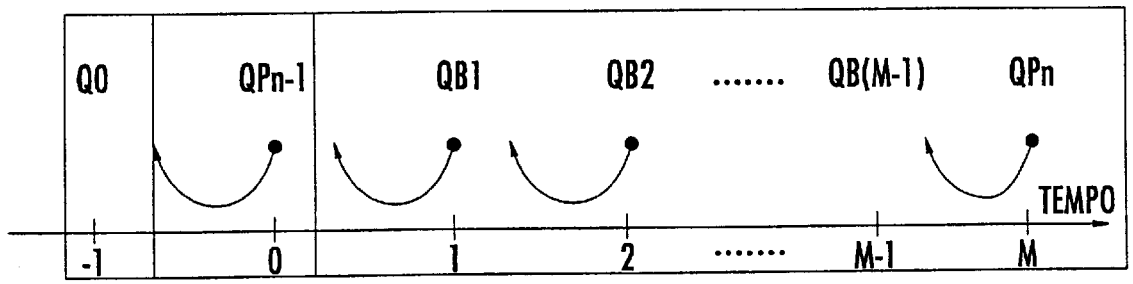
FIG. 2b shows the temporal scheme of whole fields equal in number to a certain distance between subsequent P or I fields, according to the prior art.
Figure 2C:
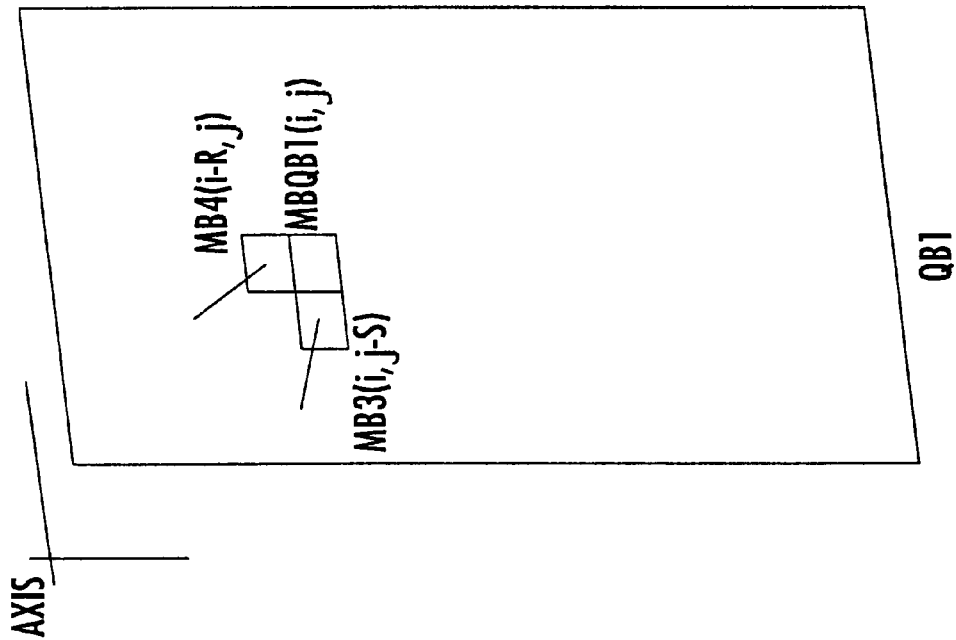
FIG. 2c is a reference scheme of the relative position of the macroblock of pixels taken into consideration in an example calculation, according to the present invention.
Figure 2C:
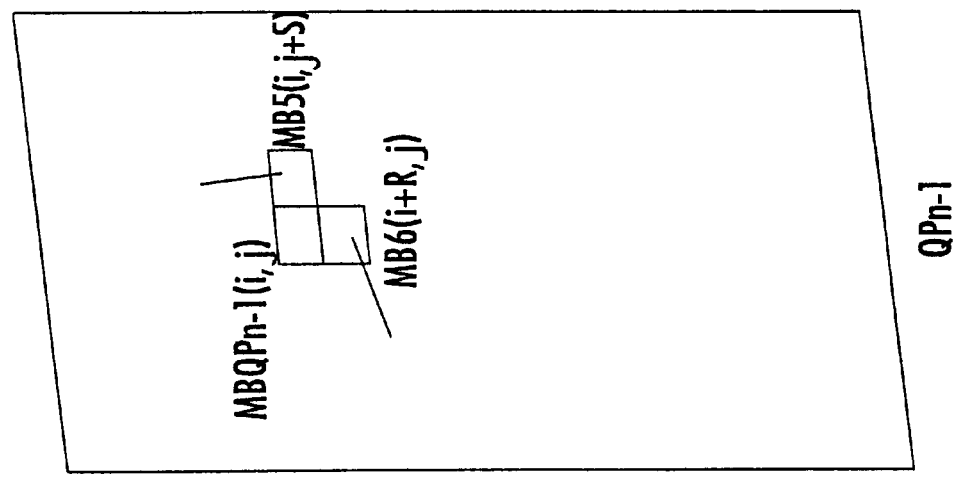
Figure 2D:
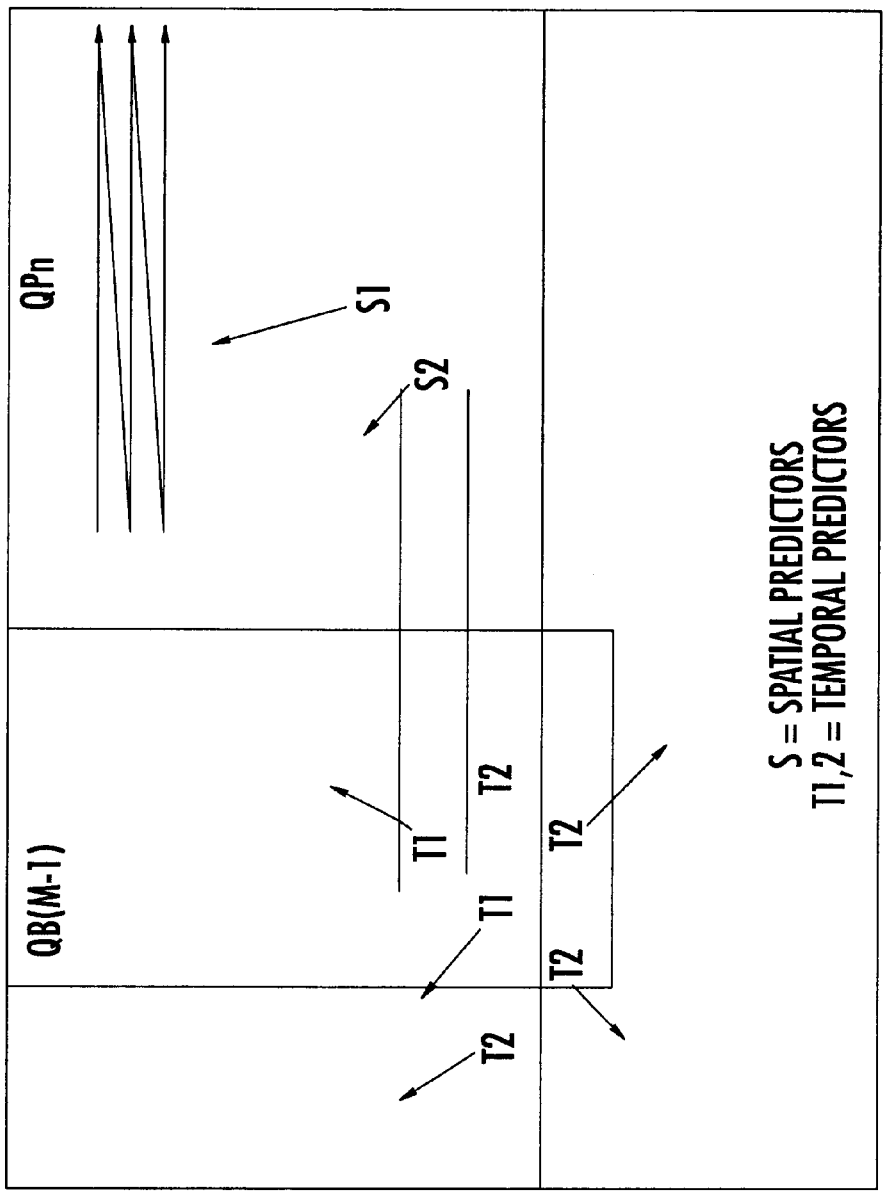
FIG. 2d shows the relative position of the spatial and temporal macroblock predictors, according to the present invention.
Figure 3:
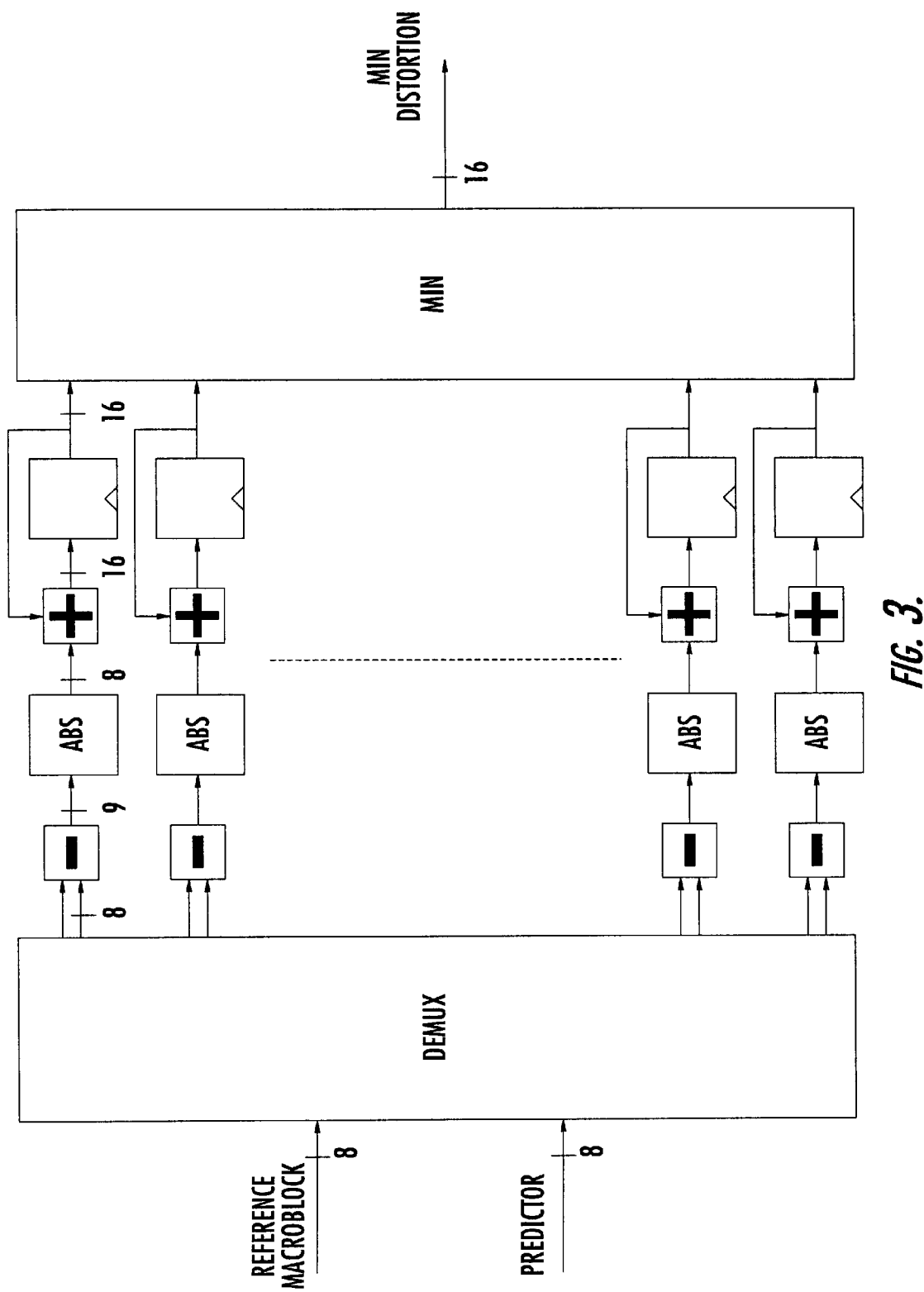
FIG. 3 is a block diagram of the calculator of the norm between predictors and reference macroblocks, wherein highlighted is the array of parallel operator blocks that conduct the calculation of the norm L1, according to the present invention.
Figure 9:
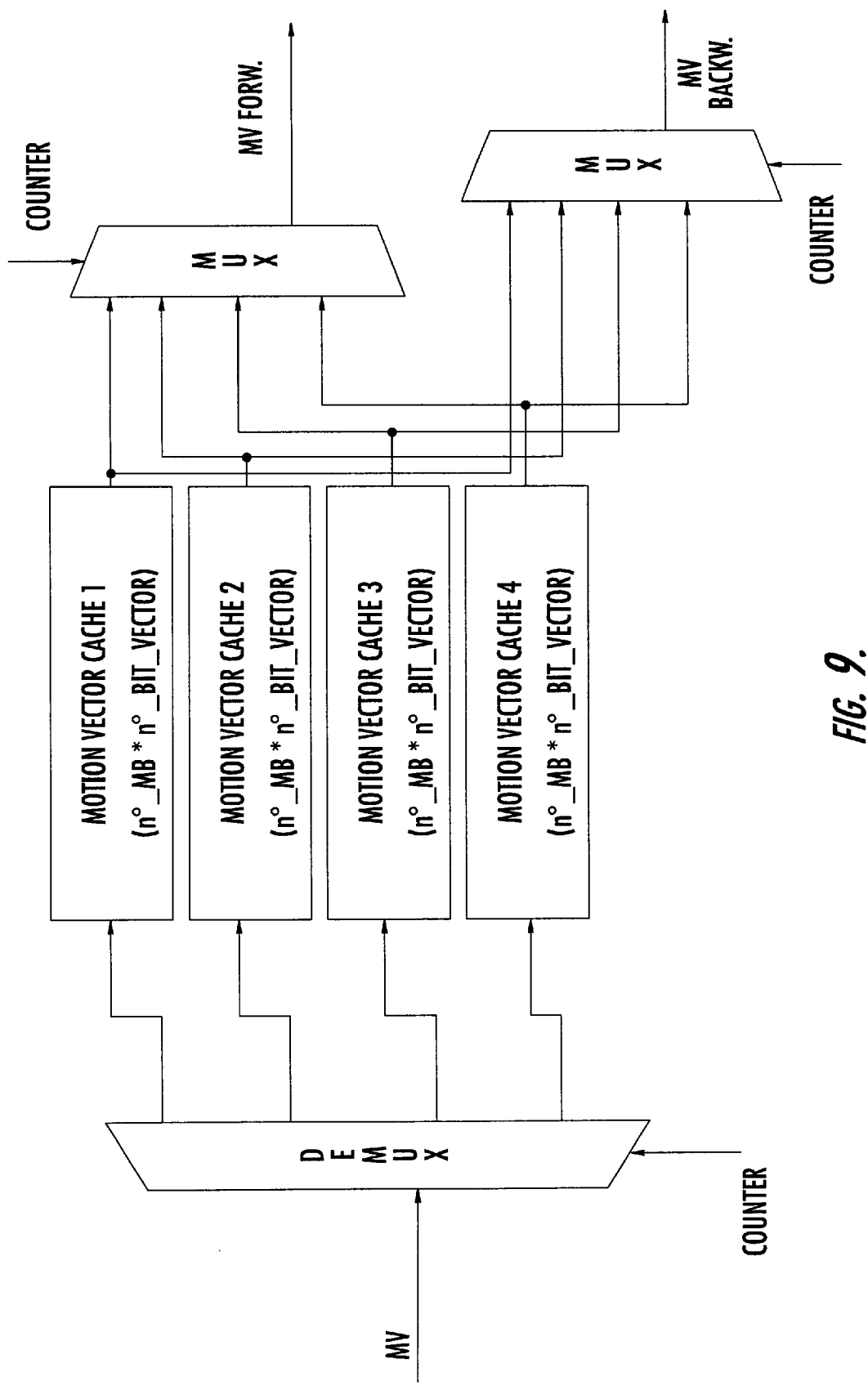
FIG. 9 shows the memory architecture for the motion fields, according to the present invention.

The number of parallel operators are reduced. Thus, the implementation of the structure shown in FIG. 3 is significantly less cumbersome and simpler because the required number of operators is halved. The structure of the block in FIG. 4 called MV cache is shown in FIG. 9. The motion vector provided by the first block is conveyed to one of the six memories intended to contain the motion fields. Each memory has a number of cells equal to $(N*M)/(R*S)$ of T bits each. Such memories provide the motion fields used in the subsequent final estimation. In particular, we have two output lines. One supplies the forward predictors, and one supplies the temporally backward predictors.

Figure 10:
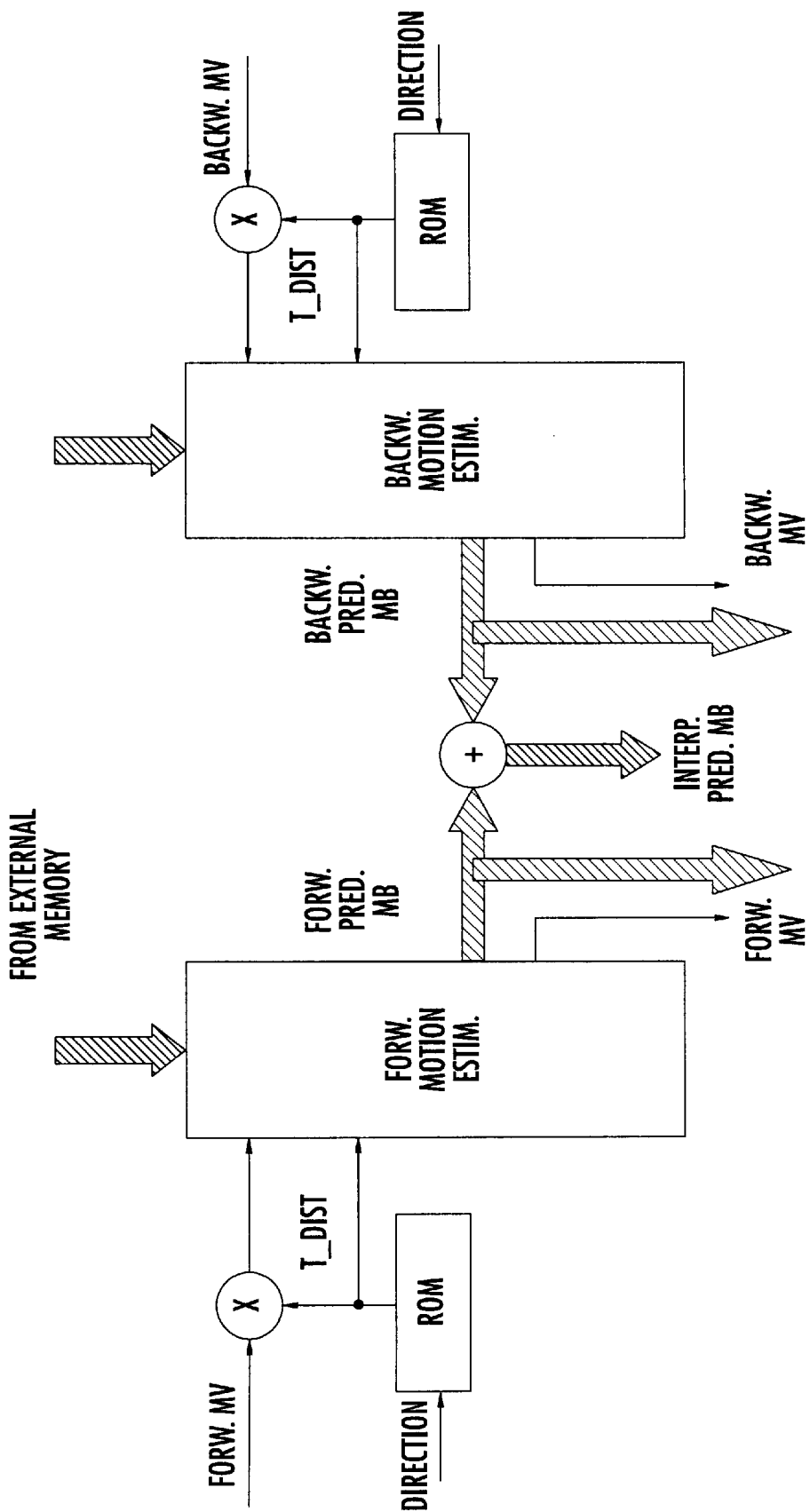
FIG. 10 is the architectural scheme of the estimator of FIG. 4, relative to the second coding phase.
Figure 11:
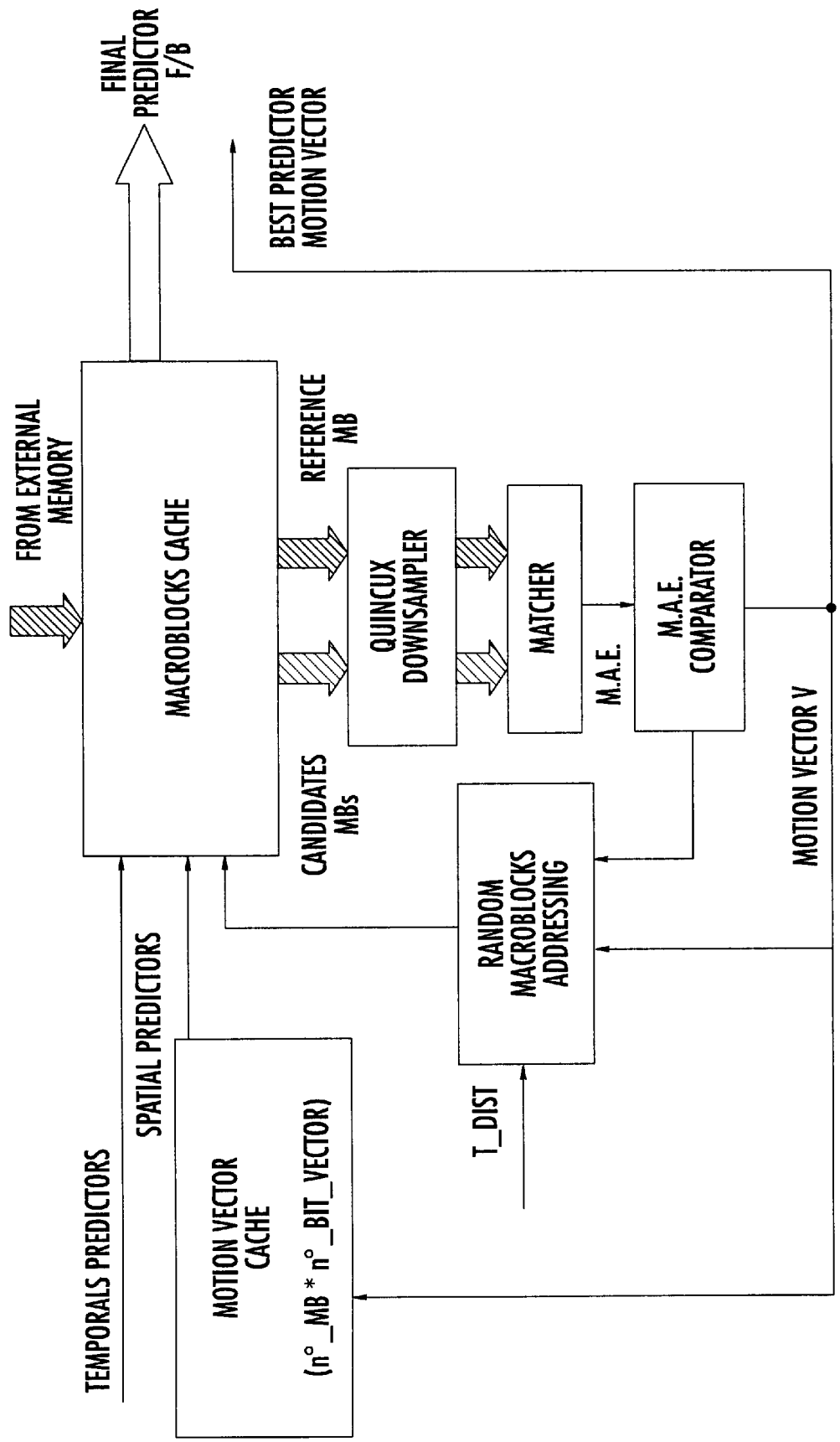
FIG. 11 shows the architecture of the estimator of FIG. 4, relative to the implementation of the conclusive coding phase.

The structure of the last block of FIG. 4, called R.M.E. fine, is shown in FIG. 10. It is possible to see how the motion vectors may be appropriately scaled as a function of the estimate direction (forward or backward) and of the temporal distance. They are then made available to the two forward and backward estimation blocks operating in parallel, and whose structures are represented in FIG. 11. The structure of the above cited estimation blocks is substantially similar to the one that operates the completion of the first estimation step as described in FIG. 5. However, this is with the exception of the absence of the memory dedicated to contain the motion field, which is contained in the MV cache.

Figure 12:
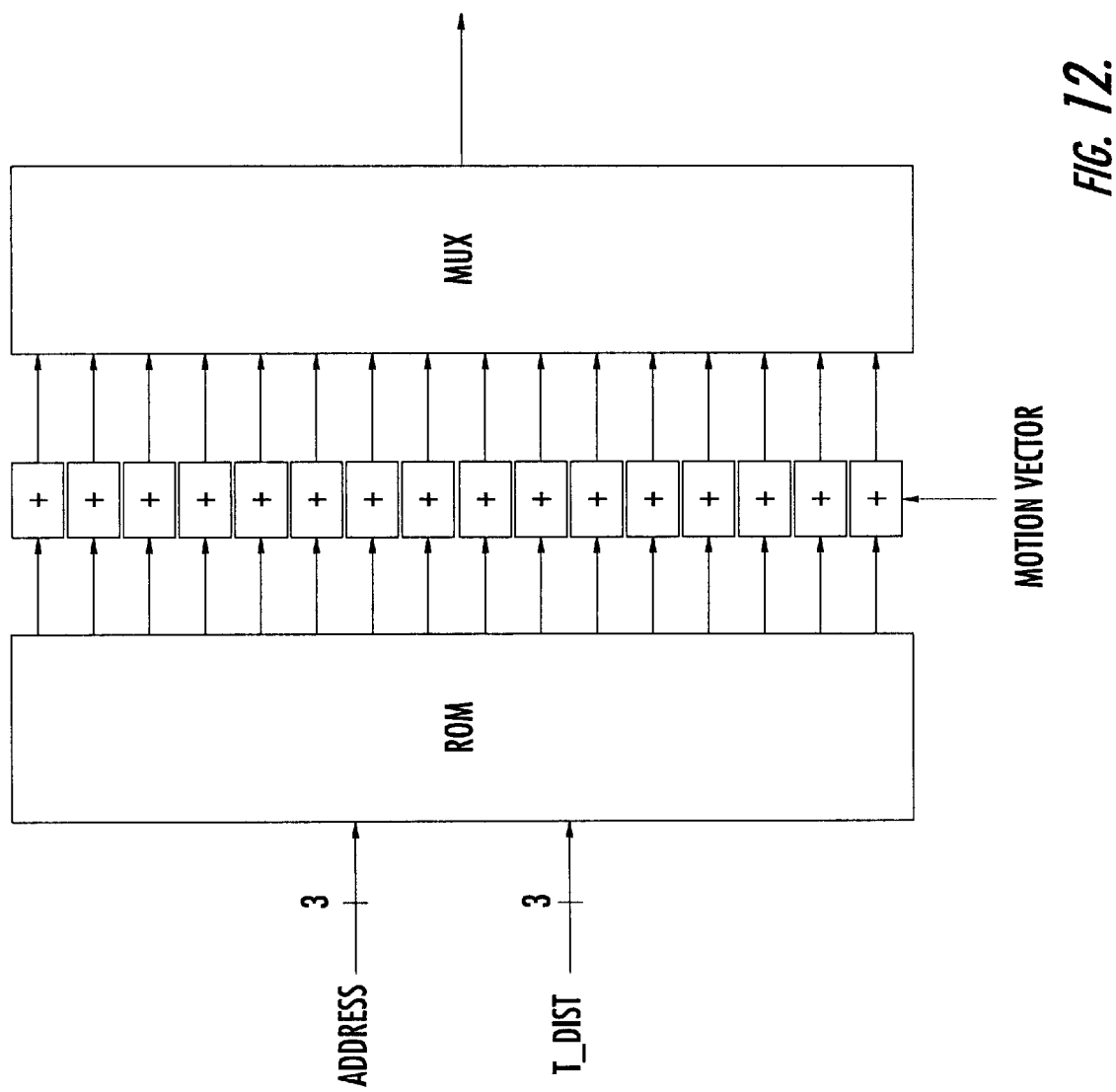
FIG. 12 shows the block representing random addressing of the macroblocks of FIG. 11.

Furthermore, the structure of the block random addressing is new, and its structure is shown in FIG. 12. The adders exist in greater number as compared to the similar block existing in the structure of the first estimating step of FIG. 8. The adders serve to apply some small variations to the prevailing vector formed by testing the spatial and temporal predictors. However, only a certain number of such adders are used. The selection is carried out based on the temporal distance to cover by the estimation. The greater the distance, the greater is the number of adders used. The selection of the type of variation is made by reading a ROM addressed by the MAE obtained from the MAE comparator. This ROM contains all the possible variations to be applied and is obtained through statistical considerations.

Figure 6:
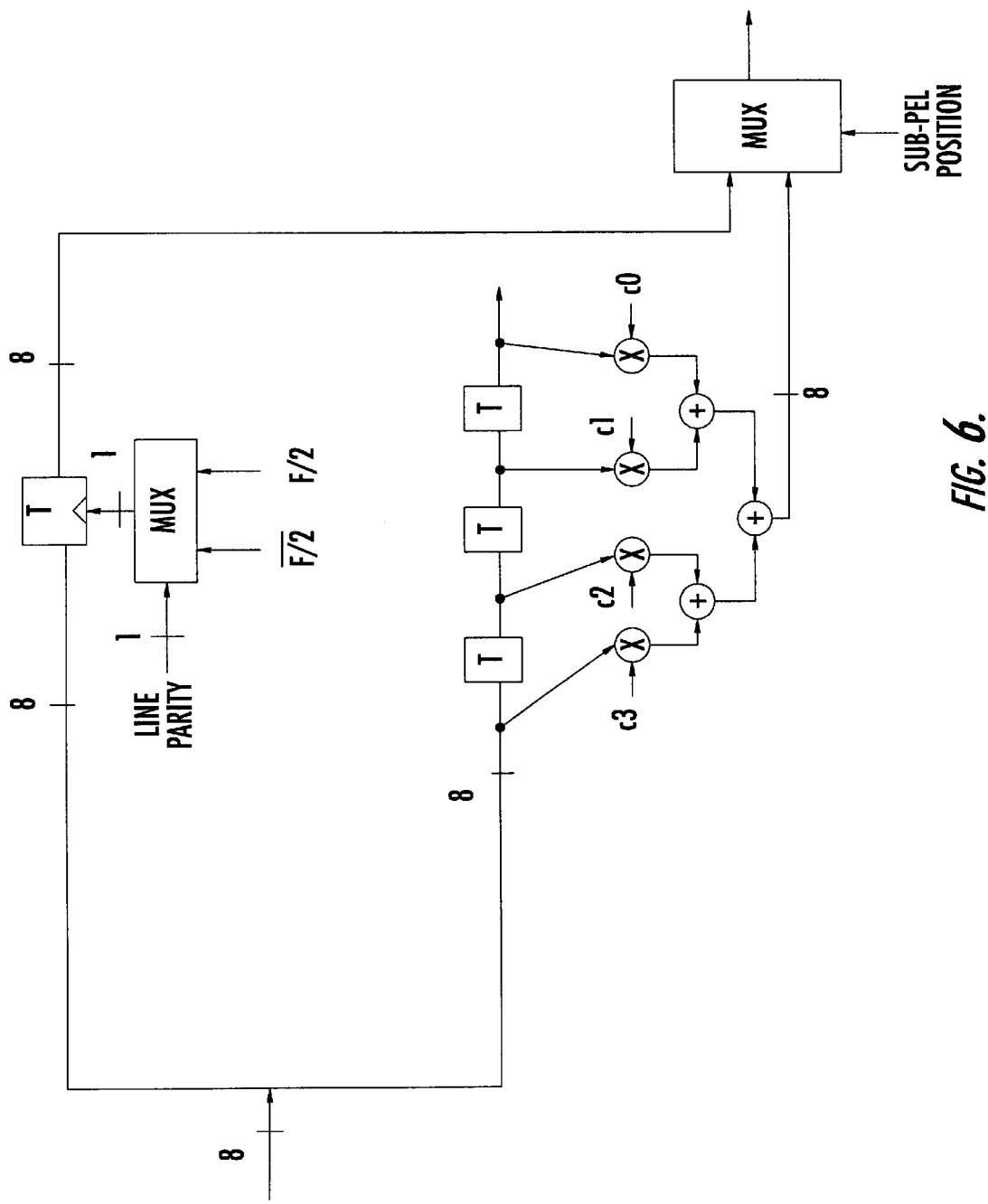
FIG. 6 is a scheme of the quincux subsampler and interpolator, according to the present invention.
Figure 7:
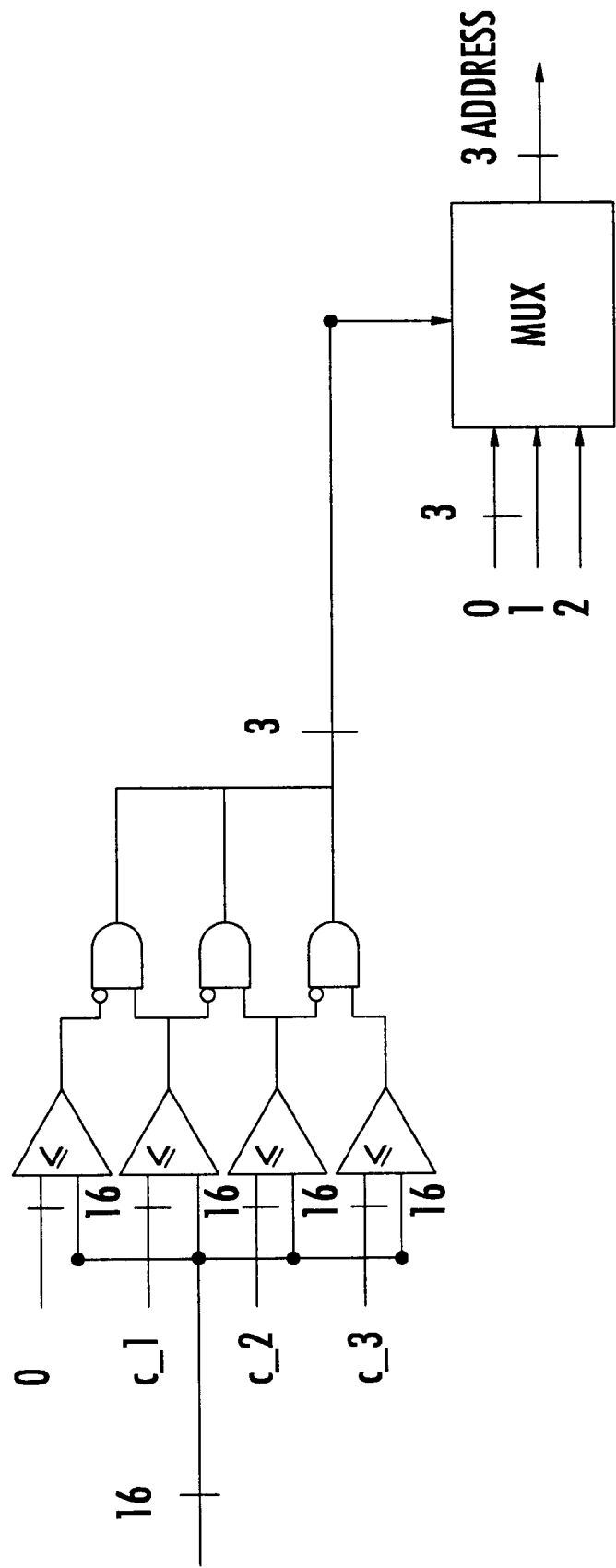
FIG. 7 shows the diagram of the M.A.E. comparator block for addressing the ROM illustrated in FIG. 8, according to the present invention.

FIGS. 6 and 7 respectively show the embodiments of the quincux subsampler and of the MAE comparator of the scheme of FIG. 11. The respective calculator of the norm L1 has a functional scheme substantially identical to the one already shown in FIG. 3. With reference to the scheme of FIG. 6, the quincux subsampler is formed by a plurality of 8-bit registers commanded, by way of a multiplexer, by two signals having the same frequency, but in opposite phase. The interpolator is formed by a plurality of T registers. This permits access to the sampled pixels at different instants, which makes them available for the downstream blocks of multiplication and addition. The coefficients C0, C1, C2, C3, C4 may, for example, take the following values, if applied to the source pixels p31, p32, p41, p42:

| p31 | p32 | p41 | p42 | |
|---|---|---|---|---|
| ½ | ½ | 0 | 0 | —I1 |
| ½ | 0 | ½ | 0 | —I2 |
| 0 | 0 | ½ | ½ | —I5 |
| 0 | ½ | 0 | ½ | —I4 |
| ¼ | ¼ | ¼ | ¼ | —I3 |
| 0 | 0 | 0 | 0 | —quincux subsampling implementation |

The multiplexer finally selects the output, depending on the type of predictor required.

With reference to the diagram of FIG. 3, the calculation circuit of the norm L1, among predictors and the reference macroblock, is composed of a demultiplexer that provides the predictors and the reference macroblock toward the appropriate operator. For example, if the macroblock has a 16*16 size, and by defining the norm L1 as the sum of the absolute values of the differences between common pixels (predictor/reference), the precision at the output of the subtractor block may be defined in 9 bits. The precision of the absolute value block is defined in bits, and the precision of the accumulation block is defined in 16 bits. The latter is formed by an adder and a 16-bit register. The outputs of the operators feed a block that calculates the minimum value, outputting the minimum value which is also called Mean Absolute Error (MAE).

With reference to the scheme of FIG. 7 which shows the architecture of the MAE comparator for addressing the ROM of the scheme shown in FIG. 9, the MAE must be comprised in one of the three subsets defined by the values $0 \div c\_1 \div c\_1 \div c\_2$, and $c\_2 \div c\_3$. Consequently, an address is produced at the output.

Figure 8:
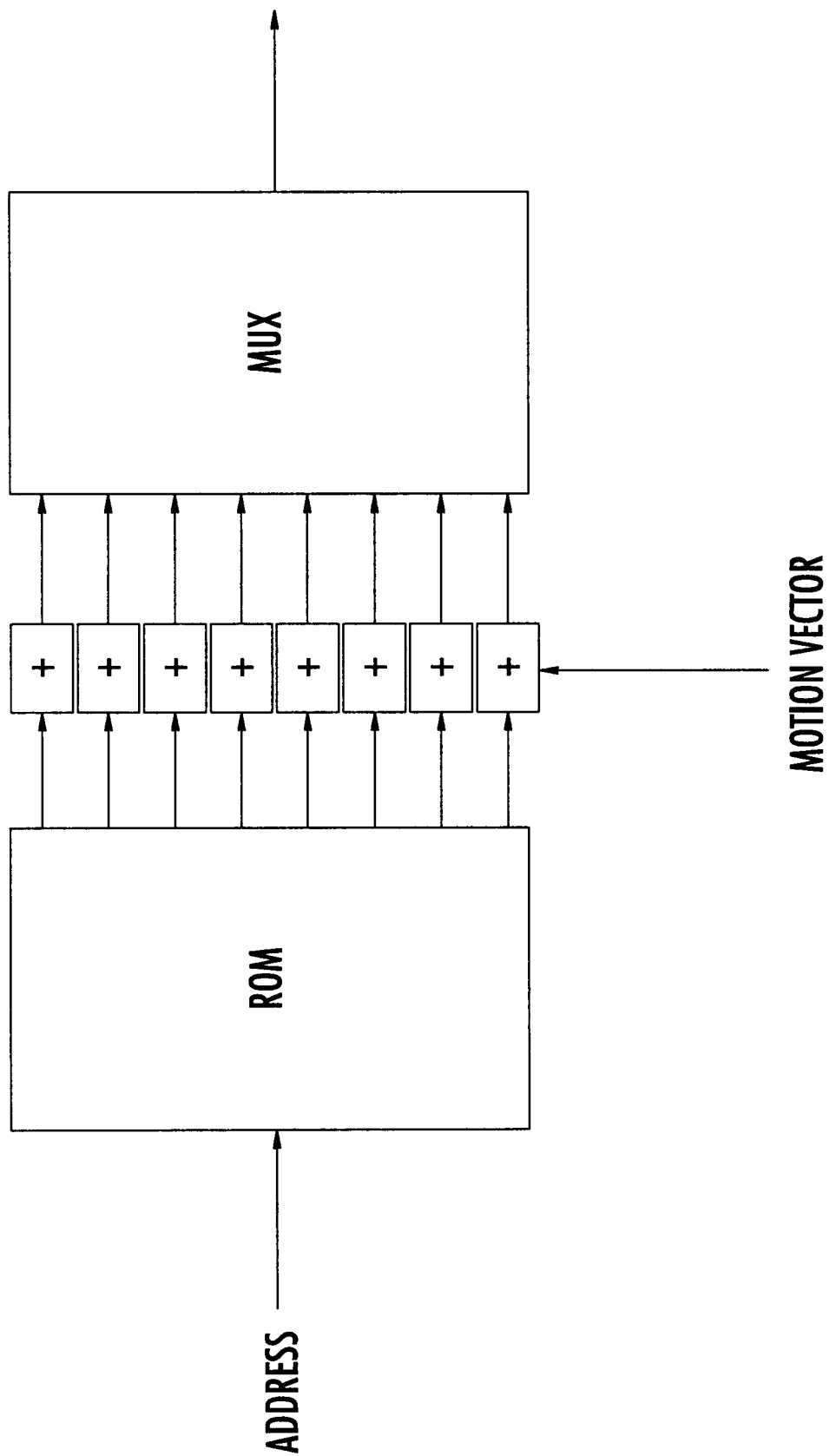
FIG. 8 is the diagram of the block representing random addressing of macroblocks, according to the present invention.

FIG. 8 shows the architecture of the macroblocks random addressing. The address produced by the block of FIG. 7 addresses a ROM which outputs 8 addresses, called motion vectors. These vectors are summed to the motion vector defined during step 1, as described above. These sums are multiplexed for addressing the macroblocks memory.

FIG. 9 shows the memory architecture of the motion fields. A demultiplexer controlled by a counter addresses the memory position for storing the single motion vector prevailing from the first step of the algorithm. The content of the single cache is written. At an output, two multiplexers, both controlled by appropriate counters, select the vectors needed for the following estimation to be implemented in the second algorithmic step. They are required simultaneously at the most two motion vectors. That is, one for the forward estimation, and one for the backward estimation.

FIG. 10 shows the implementing architecture of the second coding step, which is the estimation direction. This includes forward or backward estimation, and the temporal distance to cover. The sign and module are respectively modified according to appropriate coefficients contained in the ROM. The temporal motion vectors are read from the MV cache. The vectors will then be used by the downstream structure, which performs the final estimate phase. This phase returns, as output, the prevailing vector and the motion vector associated to it. Finally, it should be noted that the two predictors (forward and backward) are added to generate the interpolated predictor.

FIG. 11 shows the architecture of the final phase block of the motion estimation, which is similar to that of the analogous block of FIG. 5. This is relative to the implementation of the first algorithmic step, with the exception of the macroblocks random addressing block. This has a further input of T_dist which is required for the selection of the total number of variations to be applied to the prevailing vector, following the spatial/temporal predictors test.

FIG. 12 shows the random addressing macroblock, wherein the prevailing motion vectors are added to the variations selected on statistical factors, direction of the estimate, and the temporal distance to cover. The embodiments and applications of the motion estimator of the invention are numerous, among these the following can be mentioned. The motion estimation may be implemented by extracting predictors from a temporally preceding picture, and also from a temporally successive picture. If both estimations are implemented in parallel, replicas of the structure of FIG. 4, operating in parallel, may be used. The use of replicas of the motion vector memory and of the macroblocks memory is also considered. Applications include coders for recording on digital video disks (DVD RAM), camcorders, and digital coders, even if not based on the MPEG-2 standard, but requires a step of motion estimation.

That which is claimed is:

1. A method of motion estimation from common fields or pictures of successive images for video coders, the method comprising the steps of:

dividing each picture of N lines and M columns to be subjected to motion estimation into a plurality $(N/R)*(M/S)$ of reference macroblocks, each comprising R lines and S columns of pixels;

defining for each of the reference macroblocks a set of P+Q+2*D predictor macroblocks comprising at least one luminance and at least one chrominance component disposed on a preceding picture, and wherein a) P predictors are generated using motion vectors associated to macroblocks preceding the reference macroblocks on the same picture according to a raster scanning, by projecting the motion vectors on a macroblock common to the reference macroblock and disposed on the preceding picture, b) Q predictors are generated using motion vectors associated to macroblocks following the reference macroblock on the preceding picture according to a raster scanning, by projecting the motion vectors on the macroblock common to the reference macroblock placed on the preceding picture, c) 2*D predictors are generated using the motion vectors associated to P and Q predictor macroblocks summed to integer and/or fraction quantities predefined in look-up tables addressed by an integer number associated to a field between a number C of available fields of an L1 norm with minimum P and Q values and the reference macroblock, d) a subsampling block is sequentially fed with predictor values of the P+Q+2*D macroblocks and with pixel values of the reference macroblock, e) calculating per each pair of macroblocks comprising only one among the P or Q or 2*D predictors and the reference macroblock, the L1 norm, the L1 norm being the sum of differences in absolute values between common pixels belonging to the pair of macroblocks, f) identifying a minimum value of the L1 norms and calculating x and y components of the motion vector associated to the reference macroblock as a difference between the common coordinates of a first pixel, according to a raster scanning of the reference macroblock, and the predictor with minimum distortion which minimizes a value of the norm L1, and employing a recursive procedure based on a correlation existing among motion vectors associated to macroblocks adjacent to the reference macroblock during a picture processing to reduce a total number of operations by:

storing the motion vectors associated to all the macroblocks of a picture, overwriting them one by one with the motion vectors associated to corresponding macroblocks of a successive picture during the processing thereof, and as the motion vectors are calculated in succession following a raster type of scanning of the macroblocks, using the stored motion vectors already calculated, associated to the P macroblocks and the stored motion vectors associated to the Q macroblocks, noncommon to the P macroblocks adjacent to the reference macroblock during the processing of the current picture for addressing P+Q predictor values, generating two motion vectors for each macroblock of the field being processed, storable in two distinct output registers through two parallel recursive search estimators, each estimator being fed through multipliers with motion vectors read from a B number of memories containing $(N/R)*(M/S)$ motion vectors, providing the motion vectors to the two estimators for multiplying by precalculated constants contained in a read only memory whose value depends on which of the B memories the motion vectors are read, from the I, P or B field being estimated, and on whether the estimation is carried out in relation to a preceding or successive field to the one currently under estimation, and periodically overwriting the B memories with the motion vector values calculated in succession for the macroblocks relative to the future fields to the field being estimated, corresponding to the enabling period of the B memories and according to the coding process specified in steps a–f.

2. A method according to claim 1, further comprising the steps of:

identifying the predictor macroblock with minimum distortion among the P+Q predictor values;

comparing the L1 norm value associated to the minimum distortion predictor with a plurality of precalculated thresholds derived from statistical considerations, identifying a plurality of pairs of vectors, each pair being formed by vectors having components of identical absolute value but of opposite sign;

summing the pairs of vectors to the vector associated to the minimum distortion predictor, identifying a number 2*D of predictors double with respect to the number of the pairs of vectors by including intermediate or sub-pixel positions;

calculating the L1 norm value for each pair of macroblocks being formed by one predictor macroblock belonging to the 2*D set and the reference macroblock;

identifying the minimum distortion macroblock among the 2*D macroblocks; and calculating the motion vector.

3. A method according to claim 2, wherein the L1 norm value is calculated from a result obtained by subsampling the macroblock according to a quincux grid.

4. A method according to claim 2, wherein the L1 norm value is calculated by interpolating the pixels of the predictor by generating a new predictor in a sub-pixel position with respect to the plurality of positions associated to the preceding picture.

5. A method according to claim 2, wherein the video coder conforms to the MPEG-2 standard.

* * * * *

UNITED STATES PATENT AND TRADEMARK OFFICE
CERTIFICATE OF CORRECTION

PATENT NO. : 6,414,997 B1
APPLICATION NO. : 09/264077
DATED : July 2, 2002
INVENTOR(S) : Emiliano Piccinelli, Danilo Pau and Amedeo Zuccaro It is certified that error appears in the above-identified patent and that said Letters Patent is hereby corrected as shown below:

| | |
|---|---|
| Cover Page, Section 75 | Delete: "San Giovanni"<br>Insert: --Sesto San Giovanni-- |
| Column 1, Line 36 | Delete: "biredictionally"<br>Insert: --bidirectionally-- |
| Column 1, Line 54 | Delete: "691,000"<br>Insert: --691,200-- |
| Column 5, Line 8 | Delete: "$OP_n$-"<br>Insert: --$OP_{n-1}$-- |
| Column 5, Line 25 | Delete: "MB1 (i,j)"<br>Insert: --MB2 (i,j)-- |
| Column 5, Line 39 | Delete: "p32 p33 p34 p35 ..."<br>Insert: --p31 p32 p33 p34 p35 ...-- |
| Column 5, Line 40 | Delete: "p42 p43 p44 p45 ..."<br>Insert: --p41 p42 p43 p44 p45 ...-- |
| Column 5, Line 50 | Delete: "11=(p31+p32)/2"<br>Insert: --where 11=(p31+p32)/2-- |
| Column 6, Line 15 | Delete: "number operations"<br>Insert: --number of operations-- |
| Column 6, Line 58 | Delete: "artifaxes"<br>Insert: --artifacts-- |
| Column 6, Line 59 | Delete: "motioncontent"<br>Insert: --motion content-- |
| Column 7, Line 20 | Delete: "to a whole"<br>Insert: --to whole-- |
| Column 9, Line 14 | Delete: "to it associated"<br>Insert: --it is associated to-- |

UNITED STATES PATENT AND TRADEMARK OFFICE
CERTIFICATE OF CORRECTION

PATENT NO.         : 6,414,997 B1
APPLICATION NO. : 09/264077
DATED                 : July 2, 2002
INVENTOR(S)       : Emiliano Piccinelli, Danilo Pau and Amedeo Zuccaro It is certified that error appears in the above-identified patent and that said Letters Patent is hereby corrected as shown below:

| | |
|---|---|
| Column 9, Line 45 | Delete: "with. respect"<br>Insert: --with respect-- |
| Column 9, Line 60 | Delete: "sub_pixel"<br>Insert: --sub-pixel-- |
| Column 11, Line 30 | Delete: "mv MB5"<br>Insert: --mv_MB5-- |
| Column 11, Line 30 | Delete: "mv MB6"<br>Insert: --mv_MB6-- |
| Column 13, Line 5 | Delete: "0÷c_1÷"<br>Insert: --0÷c_1,-- |

Signed and Sealed this

Third Day of October, 2006

JON W. DUDAS
*Director of the United States Patent and Trademark Office*